United States Patent
Arlt et al.

(10) Patent No.: US 9,685,671 B2
(45) Date of Patent: Jun. 20, 2017

(54) ARRANGEMENT AND METHOD FOR SUPPLYING ENERGY TO BUILDINGS

(75) Inventors: Wolfgang Arlt, Nürnberg (DE); Peter Wasserscheid, Erlangen (DE)

(73) Assignee: Hydrogenious Technologies GmbH, Erlangen (DE)

( * ) Notice: Subject to any disclaimer, the term of this patent is extended or adjusted under 35 U.S.C. 154(b) by 498 days.

(21) Appl. No.: 14/240,240

(22) PCT Filed: Aug. 23, 2012

(86) PCT No.: PCT/EP2012/066452
§ 371 (c)(1),
(2), (4) Date: May 12, 2014

(87) PCT Pub. No.: WO2013/026910
PCT Pub. Date: Feb. 28, 2013

(65) Prior Publication Data
US 2014/0302412 A1    Oct. 9, 2014

(30) Foreign Application Priority Data

Aug. 23, 2011 (DE) .......... 10 2011 111 565
Dec. 10, 2011 (DE) .......... 10 2011 121 704

(51) Int. Cl.
   *H01M 8/06*  (2016.01)
   *H01M 8/04*  (2016.01)
   (Continued)

(52) U.S. Cl.
   CPC ..... *H01M 8/0612* (2013.01); *H01M 8/04216* (2013.01); *H01M 8/0656* (2013.01); *H01M 16/003* (2013.01); *Y02E 70/20* (2013.01)

(58) Field of Classification Search
   CPC .............. H01M 8/04; H01M 8/04216; H01M 8/04612; H01M 8/0656
   See application file for complete search history.

(56) References Cited

U.S. PATENT DOCUMENTS 7,169,493 B2   1/2007  Molter et al.
7,901,491 B2   3/2011  Zhao et al.
(Continued)

FOREIGN PATENT DOCUMENTS

CA   2165742 A1 *  6/1996
DE   3413772 A1    10/1985
(Continued)

OTHER PUBLICATIONS

"Waste Heat Integration of Electrical Power Generation provided by Fuel Cells", Lawrence Berkeley National Laboratory, Mar. 11, 2004. Retrieved on Jul. 26, 2016 from: http://epb.lbl.gov/thermal/waste.html#top.*

(Continued)

*Primary Examiner* — Kenneth Douyette
(74) *Attorney, Agent, or Firm* — The Webb Law Firm

(57) ABSTRACT

The present application relates to an arrangement for supplying energy to isolated buildings. The arrangement comprises at least one energy generating installation for providing an electrical current, at least one electrolyzer for producing hydrogen from water using the electrical current from the energy generating installation, at least one first chemical reactor for at least partially hydrogenating at least one substrate with an extended π-conjugated system using the hydrogen formed in the electrolyzer, at least one storage tank for storing the substrate hydrogenated at least partially in the first chemical reactor, at least one second chemical reactor for at least partially dehydrogenating the at least partially hydrogenated substrate which was produced in the first chemical reactor and stored in the storage tank with the release of hydrogen, and at least one fuel cell for the oxidation of the hydrogen release in the second chemical reactor with the release of energy.

22 Claims, 1 Drawing Sheet

(51) Int. Cl.
  *H01M 8/02*      (2016.01)
  *H01M 16/00*     (2006.01)
  *H01M 8/0612*    (2016.01)
  *H01M 8/0656*    (2016.01)
  *H01M 8/04082*   (2016.01)

(56) References Cited

U.S. PATENT DOCUMENTS

| | | |
|---|---|---|
| 9,277,846 B2 | 3/2016 | Makarov et al. |
| 2004/0013923 A1 | 1/2004 | Molter et al. |
| 2006/0204799 A1 | 9/2006 | Ishikawa et al. |
| 2008/0138675 A1 | 6/2008 | Jang et al. |
| 2008/0241615 A1 | 10/2008 | Sugimasa et al. |
| 2009/0000574 A1 | 1/2009 | Sugimasa et al. |
| 2009/0214915 A1 | 8/2009 | Kwon |
| 2010/0055513 A1 | 3/2010 | Soloveichik |

FOREIGN PATENT DOCUMENTS

| | | |
|---|---|---|
| DE | 102004030717 A1 | 1/2006 |
| DE | 202005011017 U1 | 1/2006 |
| DE | 102008006575 A1 | 10/2008 |
| DE | 102008030575 A1 | 1/2009 |
| DE | 102007039478 A1 | 2/2009 |
| DE | 102008007927 A1 | 8/2009 |
| EP | 0718904 A1 | 6/1996 |
| EP | 1475349 A2 | 11/2004 |
| JP | 60-68 A | 1/1985 |
| JP | 2002-184436 A | 6/2002 |
| JP | 200340601 A | 2/2003 |
| JP | 2004103336 A | 4/2004 |
| JP | 2005295616 A | 10/2005 |
| JP | 2007515363 A2 | 6/2007 |
| JP | 2009200026 A | 9/2009 |
| JP | 2011501356 A | 1/2011 |
| WO | 2005000457 A2 | 1/2005 |
| WO | 2009051348 A1 | 4/2009 |

OTHER PUBLICATIONS

Armbruster et al., "The Self-Sufficient Solar House Freiburg: Results and Experience with the PV/Hydrogen System", Thirteenth European Photovoltaic Solar Energy Conference, Proceedings of the International Conference, Oct. 23-27, 1995, pp. 360-363.

Curtin, "Clean, Green, and Efficient: Fuel Cells Head Home", Fuel Cells 2000, Fuel Cells.org, Aug. 2009, pp. 1-6.

Teichmann et al., "A future energy supply based on Liquid Organic Hydrogen Carriers (LOHC)", Energy & Environmental Science, 2011, vol. 4, pp. 2767-2773.

Teichmann et al., "Energy Storage in Residential and Commercial Buildings via Liquid Organic Hydrogen Carries (LOHC)", Energy & Environmental Science, Aug. 8, 2012, vol. 5, pp. 9044-9054.

* cited by examiner

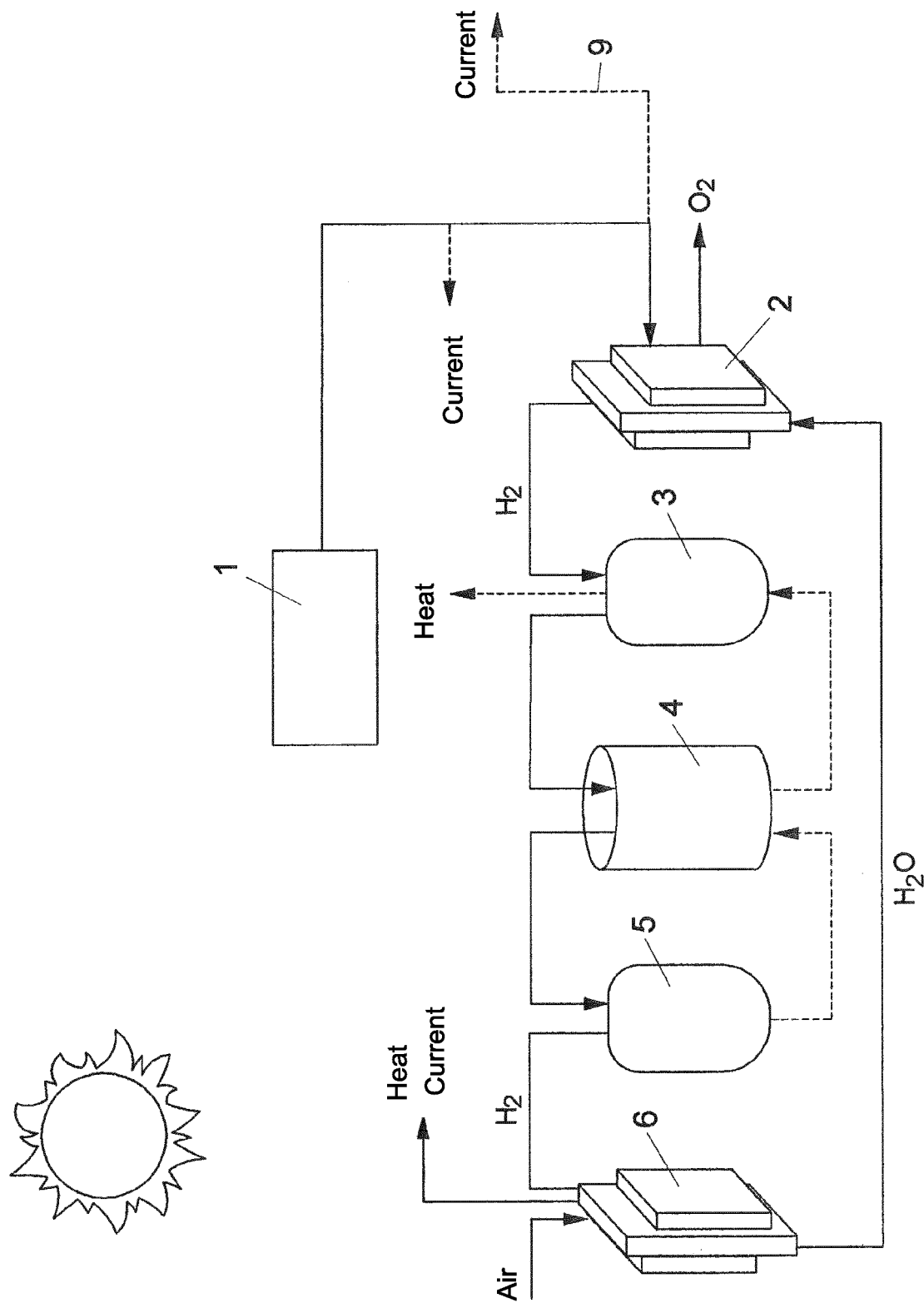

ARRANGEMENT AND METHOD FOR SUPPLYING ENERGY TO BUILDINGS

BACKGROUND OF THE INVENTION

The present invention relates to an arrangement for supplying energy and a method for supplying energy.

The use of fuel cells for generating electrical current by oxidation of oxygen is widespread known and is used in different areas. The storage or retention of hydrogen, which is, as known, extremely explosive in the presence of oxygen, is an essential and critical aspect when using fuel cells.

Until now, a series of hydrogen storage methods were investigated: adsorptive, absorptive, as liquid, as highly densed gas. The disadvantage of all methods is their low energy density per volume and in part high costs of the carrier.

The so far common methods for storing hydrogen as liquid and under pressure represent technical solutions which so far—in particular due to their high technical effort and the high costs related therewith—do not exist in the public accessible area and not at all in isolated buildings as for example private buildings, holiday buildings, commercially used real estate or production buildings.

Containers with compressed hydrogen are difficult to seal and hydrogen explodes or detonates with pressure waves>1000 m/s in almost each mixture of 4-75% with air. Furthermore, the minimal ignition energy is lower compared to other gaseous compounds. Hydrogen is rated as extremely flammable (F+) and can spontaneously combust at high outlet velocities, such is the case also with other gases. The formula conversion when exploding with air is with 286 kJ/mol very high.

It is thus desirable to provide a technology for the energy supply using fuel cells, which avoids the risks of pure hydrogen.

Alternative storage means for hydrogen are known. Different aromatic compounds, in particular condensed polycyclic hydrogens are described in EP 1 475 349 which are usable for application as hydrogen storage. The substances described here are in particular used in mobile systems.

The basis of the mode of action of condensed polycyclic hydrocarbons, which comprise an extended π-conjugated electron system, is their property to undergo a hydrogenation reaction at moderate temperatures in the presence of a suitable catalyst. Thereby hydrogen is integrated into the substance (hydrogenated) with saturation of the unsaturated double bonds.

The hydrogen integrated by hydrogenation can be again obtained from the hydrogenated product by regenerating the aromatic substance in the back reaction merely by temperature increase and/or reduction of the hydrogen pressure.

It is exemplarily pointed to the hydrogenation/dehydrogenation of N-Ethylcarbazol (NEC). Hereby N-Ethylcarbazol (NEC) as educt is converted to the perhydro-form (H12-NEC) according to the following reaction scheme.

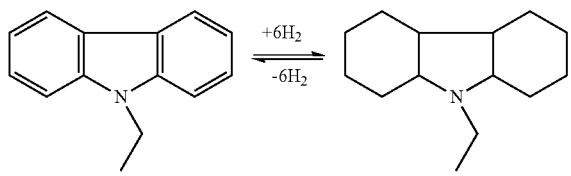

The storage density of hydrogen in this reaction is by volume about double as high as in case of a 700 bar tank filled with hydrogen.

The energy supply by solar cells is currently the most attractive possibility for the generative energy supply for isolated buildings such as private buildings, holiday buildings, commercially used real estate or production buildings. No other technology allows the renewable electricity generation with a variable power range of a few watts up to multiple MW. The integration of solar cells into the housing area is a common technology and depending on the location, roof area and orientation systems up to 30 kW peak power are common practice.

Although solar cells are the most attractive form of renewable electricity generation this technology has the disadvantage that the produced electricity cannot be intermediately stored over a longer period of time—also not in batteries due to the high storage costs and the low capacity—but has rather to be immediately consumed or to be fed into the grid. This is due to the law concerning renewable energies (EEG) of interest for the user, however provides additional burden to the electricity grid which is already under high stress.

A cost efficient possibility to store photovoltaic electricity in a medium term, e.g. for a few days up to a few weeks, is therefore an essential step in order to allow a further growth of the photovoltaic electricity generation.

The production of hydrogen by photovoltaic electricity is at present a commonly discussed option.

In order to achieve a high efficiency of the complete system an efficient coupling of the solar cells to the electrolyser, in which water is split to hydrogen and oxygen, is crucial. Hereby is to be evaluated if peek currents are of more advantage or rather a constant current supply over a longer period of time, but on a lower level. The option of a fast electricity storage for compensating peeks or fast declines for instance during cloudiness may crucially contribute as well as the selection of suitable cell technology which does not cause a complete turn off of the module for instance in case of a partial shadowing.

Some suggestions or models for the coupling of the photovoltaic with the generation of hydrogen are known. In EP 718 904 A1 is for instance a fuel cell system described which is a complete enclosed ensemble, and unifies the PEM fuel cell and a PEM electrolyzer. Herewith the requirement for a simple and cost efficient system is fulfilled. The electricity supply of the system takes places by means of the regenerative energy source provided with regenerative energy sources as for instance solar and/or wind energy.

The structure of the suggested fuel cell system allows a long life time and is designed for continues 24 hours operation. The goal is a service as simple as possible and no maintenance. An intelligent control controls fully automatic the immediate change of operating mode from hydrogen production to electricity production. Thereby the optimum operation point of the characteristic of the regenerative energy source and the PEM fuel cells/PEM electrolyzer is considered.

The PEM-electrolyzer requires distilled water for operation. The system regulates automatically the water balance required by the PEM electrolyser from a storage container provided therefore.

The described fuel cell system comprises also a hydrogen storage, which is designed in form of a metal hydride storage. This storage is made of specific metal alloys and allows the intermediate storage of gaseous hydrogen. The metal hydride storage can be filled with hydrogen in proximity to the ambient pressure.

The use of metal hydride storage as hydrogen storage is however less suitable for use in private households. They are expensive, often inefficient and have a series of intrinsic safety problems.

SUMMARY OF THE INVENTION

There is thus a requirement for supplying energy to isolated buildings such as private buildings, which are located in only loosely build up areas, which is self-sufficient an independent.

According to an exemplary embodiment of the invention the arrangement for supplying energy of buildings, in particular of singular, isolated buildings such as private buildings, holiday buildings, commercially used real estate or production buildings, comprises
- at least one energy generating installation, in particular a photovoltaic installation, for providing an electrical current,
- at least one electrolyser for generating hydrogen from water using the electrical current from the energy generating installation,
- at least one first chemical reactor for at least partially hydrogenating at least one substrate with an extended π-conjugated system using the hydrogen generated in the electrolyser,
- at least one storage tank for storing the substrate at least partially hydrogenated in the first chemical reactor,
- at least one second chemical reactor for at least partially dehydrogenating the at least partially hydrogenated substrate generated in the first chemical reactor and stored in the storage tank with the release of hydrogen, and
- at least one fuel cell for the oxidation of the hydrogen released in the second chemical reactor with the release of energy.

The following functional elements for supplying energy of isolated buildings are thus coupled or combined with each other:
- solar energy supply,
- hydrogen generation by electrolysis,
- efficient, safe and cost efficient hydrogen storage for the middle term storage without loss,
- fuel cell for reconversion the hydrogen, and
- use of the exothermal hydrogenation and the exothermy of the fuel cell for providing heat and electrical current in the house for increasing the efficiency.

A generation of low pressure hydrogen in conventional electrolysers and immediate conversion of the hydrogen via a hydrogenation of suitable compounds is a highly interesting and relevant alternative, which circumvents the difficulties of the hydrogen storage, but still allow the coupling with the photovoltaic. By reconverting the hydrogen and conversion by means of a fuel cell a closed electric circuit can thus be provided.

The present arrangement allows thus the securing of the autonomous all year operation of a house and/or its intermediate storage capacity for excess electricity on the basis of the presently used infrastructure, for instance by using an oil tank.

By means of the present arrangement an low energy substrate is converted into its rich energy form by generating electrical energy for instance from sunlight by means of photovoltaic, but also from other suitable renewable energy sources, which is in turn used for the generation of hydrogen and oxygen by splitting water. The formed hydrogen is then used for hydrogenating the low energy form of the used hydrocarbon into the high energy form. In particular suitable low energy substrates are polycyclic, aromatic compounds with an extended π-electron system, which form the respective saturated polycyclic compounds during hydrogenation. The hydrogenation is exothermic and the heat generated during the hydrogenation can be used in a heating system, for instance in a house. In times of lacking sun radiation the high energy form of the hydrocarbon is converted back into the low energy form by producing hydrogen, which generates cell electrical energy and heat in a fuel.

The advantage of the present arrangement and the method described in the following is that an isolated building, as for instance a private building, can be operated self-sufficient by using renewable energy as for instance photovoltaic but also wind energy. In other words the energy demand and the energy supply can be covered self-sufficiently and independent on further energy sources and thus on an electricity grid. A further advantage is that the factor hydrogen important for the energy supply does not have to be present in large amounts in contrast to the so far known methods and models, but can be stored in a chemical substance safe and without pressure in an available infrastructure in a timely unlimited manner.

In a preferred embodiment the at least one electrolyser is connected to the at least one fuel cell via the first chemical reactor, the storage tank and the second chemical reactor. Thus, the singular components or parts of the present arrangement form a system for energy supply and storage combined in itself. The singular cells and reactors of the present arrangement are connected by suitable connecting lines for transferring hydrogen as well as the low energy or high energy form of the aromatic hydrocarbons. The lines for the hydrogen transport are made preferably of gas tight and pressure tight materials.

It is preferred that the at least one low energy substrate with an extended π conjugated system is selected from a group containing polycyclic aromatic hydrocarbons, polycyclic hetero aromatic hydrocarbons, π conjugated organic polymers or a combination thereof.

In an exemplary embodiment the at least one low energy substrate with an extended π conjugated system is selected from a group containing condensed hetero aromatic hydrocarbons with N, S or as a O hetero atom, wherein the hetero atoms can be present substituted or non-substituted. The condensed hetero aromatic hydrocarbons are thereby preferably ring systems with C6 to C30, preferably C8 to C20, in particular C12.

In a further preferred embodiment the heteroatoms of the condensed hydrocarbons are substituted with at least one alkyl group, at least one aryl group, at least one alkenyl group, at least one alkinyl group, at least one cycloalkyl group and/or at least one cycloalkenyl group, wherein substitutions of the hetero atoms with C1-C30 alkyl, preferably C1-C10 alkyl, in particular with C2-C5 alkyl are preferred and can contain further hetero atoms.

In a particular preferred embodiment N-ethylcarbazol, N-n-propylcarbazolor N-isopropylcarbazol is used as a low energy substrate suitable for storing hydrogen.

The term "substituted" when used with "alkyl", "alkinyl", "aryl" etc. designates the substitution of one or multiple atoms, usually H-atoms, by one or multiple of the following substituents, preferably by one or two of the following substituents: halogen, hydroxy, protected hydroxyl, oxo, protected oxo, $C_3$-$C_7$-cycloalkyl, bicyclic alkyl, phenyl, naphthyl, amino, protected amino, monosubstituted amino, protected monosubstituted amino, disubstituted amino, guanidine, protected guanidine, a heterocyclic ring, a substituted heterocyclic ring, imidazolyl, indolyl, pyrollidinyl, $C_1$-$C_{12}$-alkoxyl, $C_1$-$C_{12}$-acyl, $C_1$-$C_{12}$-acyloxy, acryloyloxy, nitro, carboxy, protected carboxy, carbamoyl, cyano, methylsulfonylamino, thiol, $C_1$-$C_{10}$-alkylthiol and $C_1$-$C_{10}$-alkylsulfonyl. The substituted alkyl groups, aryl groups, alkenyl groups can be substituted once or multiple times and preferably one or two times with the same or different substituents.

The term "alkinyl" as used here designates a moiety of the formula R—R≡C, in particular a "$C_2$-$C_6$-alkinyl". Examples for $C_2$-$C_6$-alkinyls include: ethinyl, propinyl, 2-butinyl, 2-pentinyl, 3-pentinyl, 2-hexinyl, 3-hexinyl, 4-hexinyl, vinyl as well as di and tri-ines of linear or branched alkyl chains.

The term "aryl" as used herein designates aromatic hydrocarbons, for instance, phenyl, benzyl, naphtyl or anthryl. Substituted aryl groups are aryl groups which are as defined above substituted with one or multiple substituents as defined above.

The term "cycloalkyl" comprises the groups of cyclopropyl, cyclobutyl, cyclopentyl, cyclohexyl and cycloheptyl.

The term "cycloalkenyl" comprises the groups of cyclopentyl, cyclohexenyl, cycloheptenyl and cyclooctenyl.

It is of an advantage if the low energy substrate with an extended π-conjugated system is at least partially hydrogenated in the first chemical reactor at a temperature between 50 and 100° Celsius, preferably 80 and 100° Celsius and a pressure between 2 and 200 bar, preferably 10 to 100 bar in the presence of a suitable noble metal catalyst. Particularly suitable catalysts for hydrogenating the low energy substrate contain the element ruthenium.

In a further embodiment a low temperature polymer electrolyte membrane fuel cell (PEM) is used as a fuel cell. These fuel cells cannot only be used in their actual function for hydrogen oxidation, whereby the oxygen required for the hydrogen oxidation is obtained from the air, but can also be operated in a reversed function as electrolyser, wherein the water required for the electrolyser is obtained solely from the air humidity. Hereby it is also possible that the required water is recycled from the fuel cell or is taken from a tank. Thus, the at least one electrolyser is operated preferably as a reversed operated low temperature polymer electrolyte membrane fuel cell (PEM).

It is also of an advantage if at least one water storage medium is arranged in the at least one electrolyser.

The storage tank preferably used for the intermediate storage of the high energy and optionally low energy forms of the used hydrocarbon has the configuration and construction of usually used conventional fuel oil tanks.

The present arrangement allows to conduct a method for supplying energy of isolated buildings by using the above arrangement with the following steps:
providing an electrical current, preferably a direct current, from at least one renewable energy source, in particular a photovoltaic installation or wind turbine plant,
generating hydrogen from water in at least one electrolyser by using the electrical current from the at least one renewable energy source and optionally using the heat generated thereby for instance for providing warm water,
transferring the generated hydrogen from the at least one electrolyser into a first chemical reactor containing at least one substrate with an extended π-conjugated system and at least partial hydrogenation of the substrate,
transferring the at least partially hydrogenated substrate from the first chemical reactor into at least one storage tank and optional storing the at least one partially hydrogenated substrate in the storage tank,
transferring the at least partially hydrogenated substrate from the storage tank into at least one second chemical reactor and dehydrogenating the at least partially hydrogenated substrate in the second chemical reactor by releasing hydrogen, and
transferring the hydrogen from the second chemical reactor into at least one fuel cell and oxidation of the hydrogen and of oxygen present in the fuel cell to water the simultaneous release of energy in form of electrical current and heat.

In an exemplary embodiment of the present method, the hydrogen generated in the electrolyser is used without intermediate storage for the at least partial hydrogenation of the at least one substrate with an extended π-conjugated system in the first chemical reactor. The hydrocarbon to be at least partially hydrogenated is present in the first chemical reactor preferably in liquid form. It is, however, also conceivable to use hydrocarbons in a solid aggregate status.

It is furthermore of an advantage, if the heat generated during the at least partial hydrogenation of the at least one substrate with an extended π-conjugated system in the first chemical reactor is channeled into a heating system of the isolated building or house. The at least partially hydrogenated substrate with a π-conjugated system is dehydrogenated in the second chemical reactor with heat supply. The heat required for the dehydrogenation comes preferably from the heating system of the isolated building, can, however, also be supplied when required from a further external source as for instance direct sun light. Subsequently, the substrate dehydrogenated in the second chemical reactor is recycled from a second chemical reactor via the storage tank into the electrolyser. Thus, a complete recycling of the used substances takes place. Since the used substrate is not consumed, very long usage times or a high number of recycling circles can be aimed for.

It is also of an advantage if the water formed in the fuel cell during the hydrogen oxidation is transferred into the electrolyser. It is also conceivable that the water formed in the fuel cell is only partially recycled.

The heat released in the fuel cell and in the first chemical reactor function as hydrogenation reactor is preferably passed into the heating system and the released electric current is passed into the electrical network of the isolated building. Thus, an even and constant heat and energy supply is guaranteed also during fluctuating external conditions as different sun light by the present method. It is also conceivable to release the generated energy, for instance electrical current from at least one renewable energy source to the outside to an external electrical grid for stabilizing the electrical grids. It can further be profitable at times when electricity is cheap or even negatively priced, to take up said energy in addition to the at least one renewable energy source or alone into the system, and at times when electricity is very expensive to pass electricity to the outside.

The oxygen required for the hydrogen oxidation in the fuel cell is provided preferably from the outside, i.e. outside of the building, into the fuel cell in form of air or pure oxygen. Thus, an installation of oxygen generating devices is not required. It is, however, also conceivable to feed the oxygen formed in the electrolyser during the water hydrolyses directly into the fuel cell.

BRIEF DESCRIPTION OF THE DRAWINGS

The invention is being explained in the following with reference to the figures of the drawings.

The FIGURE A schematic illustration of an embodiment of the arrangement according to the invention.

DESCRIPTION OF THE INVENTION

In the FIGURE, a preferred embodiment of the arrangement according to the invention is schematically illustrated.

A photovoltaic installation preferably with multiple solar cell panels arranged on the roof of a building is used as energy source or energy generating plant 1. Said panels should be arranged preferably such that the highest possible yield of solar radiation is guaranteed. The photovoltaic plant 1 allows also the generation of direct current with which hydrogen can be produced without a risk.

The direct current produced is transferred into an electrolyser 2, for instance a PEM electrolyser, which is provided in form of a PEM fuel cell operating reversely as electrolyzing cell. This double function of the fuel cell simplifies the plant and reduces costs. It is also possible to use instead of a PEM electrolyser the commercial electrolyzing cell and a separate fuel cell.

The electrolysis runs exo-thermally and the heat generated during the electrolysis can be used immediately in a private building for instance for warm water supply. In as much the efficiency of the used electrolyzing cells is not decisive.

The generated hydrogen is used immediately without intermediate storage for hydrogenating N-ethylcarbazol or its partially hydrogenated high energy pendants. For this purpose, the content of the tank is pumped through a chemical reactor 3 and partially hydrogenated. A complete hydrogenation is possible but not required.

When withdrawing energy the (partial) hydrogenated content of the storage tank 4 is transferred through an endothermic operating dehydrogenation reactor and hydrogen is released thereby. Said hydrogen is converted in the fuel cell 6, for instance a PEM fuel cell, into electricity, water and heat. The water is available optionally for electrolysis, the heat serves for heating the dehydrogenation reactor and for the heat supply of the building.

FIG. 1 shows additionally an external power connection 9 which allows the feeding of external current. The external connection 9 allows also the back-feeding of excess energy into the electrical grid.

EXAMPLE

A 120 qm house forms the basis, which is build according to ENEV 2012 and has an annual heating requirement of 30 kWh/qm and warm water requirement of 12.5, in some 42.5 kWh/qm.

With a heating value of hydrogen in Perhydro-N-Ethylcarbazol an annual volume of 2,400 liters=5,100 kWh/a of a low energy substance, thus the present tank size of an oil heating. An electrical need of 4,065 kW comes on top of it such that the total energy need is 9,165 kW/a.

If one calculates 1 qm a solar panel with 100 W and a full load time of 1,000 h, 100 kWh/qm or for 9,165 kWh 92 qm solar panel for complete annual energy supply are required.

Herewith it is shown that by estimation a one-family house with 92 qm solar cells and a 2,400 liter storage tank can be self-sufficient.

The invention claimed is:

1. An arrangement for supplying energy to buildings, comprising:
   at least one energy generating installation for providing an electrical current,
   at least one electrolyser for generating hydrogen from water using the electrical current from the energy generating installation,
   at least one first chemical reactor for at least partially hydrogenating at least one substrate with an extended π-conjugated system using the hydrogen generated in the electrolyser,
   at least one storage tank for storing the substrate hydrogenated at least partially in the first chemical reactor,
   at least one second chemical reactor for at least partially dehydrogenating the at least partially hydrogenated substrate generated in the first chemical reactor and stored in the storage tank with the release of hydrogen,
   at least one fuel cell for the oxidation of the hydrogen released in the second chemical reactor with the release of energy, and
   a heat transmission device at least one of for transmitting the heat generated in first chemical reactor into a heating system of the building and for transmitting the heat required for dehydrogenation from the heating system of the building to the second chemical reactor.

2. The arrangement according to claim 1, wherein the at least one electrolyser is connected to the at least one fuel cell via the first chemical reactor, the storage tank and the second chemical reactor.

3. The arrangement according to claim 1, wherein the at least one substrate with an extended π-conjugated system is selected from a group containing polycyclic aromatic hydrocarbons, polycyclic heteroaromatic hydrocarbons, π-conjugated organic polymers or a combination thereof.

4. The arrangement according to claim 1, wherein the at least one substrate with an extended π-conjugated system is selected from a group containing condensed heteroaromatic hydrocarbons with N, S or O as a substituted or non-substituted hetero atom.

5. The arrangement according to claim 4, wherein the condensed heteroaromatic hydrocarbons are ring systems with C6 to C30.

6. An arrangement for supplying energy to buildings, comprising:
   at least one energy generating installation for providing an electrical current,
   at least one electrolyser for generating hydrogen from water using the electrical current from the energy generating installation,
   at least one first chemical reactor for at least partially hydrogenating at least one substrate with an extended π-conjugated system using the hydrogen generated in the electrolyser,
   at least one storage tank for storing the substrate hydrogenated at least partially in the first chemical reactor,
   at least one second chemical reactor for at least partially dehydrogenating the at least partially hydrogenated substrate generated in the first chemical reactor and stored in the storage tank with the release of hydrogen,
   at least one fuel cell for the oxidation of the hydrogen released in the second chemical reactor with the release of energy, and
   a heat transmission device at least one of for transmitting the heat generated in at least one of the first chemical reactor and the fuel cell into a heating system of the building and for transmitting the heat requited for dehydrogenation from the heating system of the building to the second chemical reactor,
   wherein the at least one substrate with an extended π-conjugated system is selected from a group containing condensed heteroaromatic hydrocarbons with N, S or O as a substituted hetero atom, and wherein the hetero atoms are substituted with at least one alkyl group, at least one aryl group, at least alkenyl group, at least one alkinyl group, at least one cycloalkyl group and/or at least cycloalkylene group.

7. An arrangement for supplying energy to buildings, comprising:
  at least one energy generating installation for providing an electrical current,
  at least one electrolyser for generating hydrogen from water using the electrical current from the energy generating installation,
  at least one first chemical reactor for at least partially hydrogenating at least one substrate with an extended π-conjugated system using the hydrogen generated in the electrolyser,
  at least one storage tank for storing the substrate hydrogenated at least partially in the first chemical reactor,
  at least one second chemical reactor for at least partially dehydrogenating the at least partially hydrogenated substrate generated in the first chemical reactor and stored in the storage tank with the release of hydrogen,
  at least one fuel cell for the oxidation of the hydrogen released in the second chemical reactor with the release of energy, and
  a heat transmission device at least one of for transmitting the heat generated in at least one of the first chemical reactor and the fuel cell into a heating system of the building and for transmitting the heat required for dehydrogenation from the heating system of the building to the second chemical reactor,
  wherein the at least one substrate with an extended π-conjugated system is selected from a group containing condensed heteroaromatic hydrocarbons with N, S or O as a substituted hetero atom, and
  wherein the hetero atoms are substituted with C1-C30-alkyl.

8. The arrangement according to claim 1, wherein N-ethylcarbazol, N-n-propylcarbazol, N-iso-propylcarbazol are used as a substrate with an extended π-conjugated system.

9. The arrangement according to claim 1, wherein the substrate with an extended π-conjugated system is at least partially hydrogenated in the first chemical reactor at a temperature between 50 and 180° Celsius and a pressure between 2 and 200 bar in the presence of a suitable catalyst.

10. The arrangement according to claim 1, wherein the at least one fuel cell is a low temperature polymer electrolyte membrane fuel cell (PEM) and that the at least one electrolyser is a reversed operated low temperature polymer electrolyte-membrane fuel cell (PEM).

11. The arrangement according to claim 1, wherein at least one water storing medium is arranged in the at least one electrolyser.

12. A method for supplying energy of isolated buildings using an arrangement according to claim 1, comprising the steps
  providing an electrical current, preferably a direct current, from at least one renewable energy source, in particular a photovoltaic installation,
  generating hydrogen from water in at least one electrolyser by using the electrical current from the at least one renewable energy source,
  transferring the generated hydrogen from the at least one electrolyser into a first chemical reactor containing at least one substrate with an extended π-conjugated system and at least partial hydrogenating the substrate,
  transferring the at least partially hydrogenated substrate from the first chemical reactor into at least one storage tank and optionally storing the at least partially hydrogenated substrate in the storage tank,
  transferring the at least partially hydrogenated substrate from the storage tank into at least one second chemical reactor and dehydrogenating the at least partially hydrogenated substrate in the second chemical reactor by releasing hydrogen,
  transferring the hydrogen from the second chemical reactor into at least one fuel cell and oxidation of the hydrogen and of oxygen present in the fuel cell to water with simultaneous release of energy in form of electrical current and heat.

13. The method according to claim 12, wherein the hydrogen generated in the electrolyser is used without intermediate storage for the at least partial hydrogenation of the at least one substrate with an extended π-conjugated system in the first chemical reactor.

14. The method according to claim 12, wherein the heat generated during the at least partial hydrogenation of the at least one substrate with an extended π-conjugated system in the first chemical reactor is channeled into a heating system of the isolated building.

15. The method according to claim 12, wherein the at least partially hydrogenated substrate with an extended π-conjugated system is dehydrogenated in the second chemical reactor with heat supply.

16. The method according to claim 15, wherein the heat required for the dehydrogenation is used from the heating system of the isolated building.

17. The method according to claim 12, wherein the substrate dehydrogenated in the second chemical reactor is recycled from the second chemical reactor via the storage tank to the electrolyser.

18. The method according to claim 12, wherein the water formed in the fuel cell during the hydrogen oxidation is transferred to the electrolyser.

19. The method according to claim 12, wherein the heat released in the fuel cell is passed into the heating system and the released electrical current is passed into the electrical network of the isolated building or into an external grid.

20. The method according to claim 12, wherein the oxygen required for hydrogen oxidation in the fuel cell is fed from outside into the fuel cell in form of air.

21. The method according to claim 12, wherein additional electrical current is fed into the electrical network of the isolated building from a further energy source if required.

22. The method according to claim 12, wherein additional electrical current is fed back into the external electrical network from the fuel cell when required.

* * * * *

UNITED STATES PATENT AND TRADEMARK OFFICE
CERTIFICATE OF CORRECTION

PATENT NO. : 9,685,671 B2  
APPLICATION NO. : 14/240240  
DATED : June 20, 2017  
INVENTOR(S) : Wolfgang Arlt et al.

Page 1 of 1

It is certified that error appears in the above-identified patent and that said Letters Patent is hereby corrected as shown below:

On the Title Page

Column 1, Item (75) Inventors, Line 1, delete "Numberg" and insert -- Nurnberg --

In the Claims

Column 8, Line 19, Claim 1, after "in" insert -- the --

Column 9, Line 5, Claim 6, delete "alkinyl" and insert -- alkynyl --

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*